Dec. 30, 1941. G. L. WALKER Re. 21,991
STARTING DEVICE FOR CUTTING TORCHES
Original Filed Jan. 29, 1938
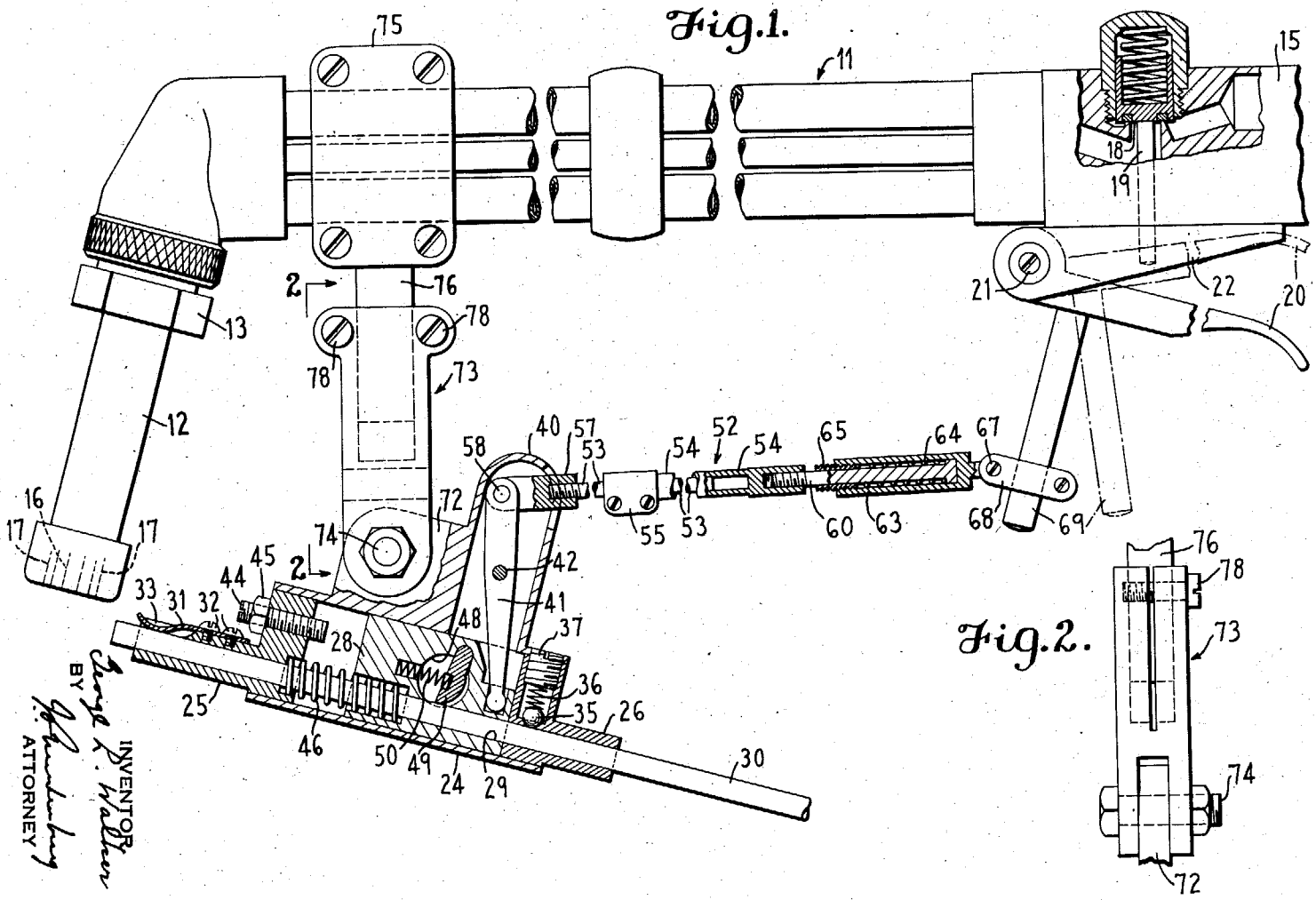
INVENTOR
George L. Walker
BY
J. Rundenberg
ATTORNEY Reissued Dec. 30, 1941 Re. 21,991

UNITED STATES PATENT OFFICE 21,991

STARTING DEVICE FOR CUTTING TORCHES

George L. Walker, Jersey City, N. J., assignor to Air Reduction Company, Incorporated, New York, N. Y., a corporation of New York Original No. 2,158,489, dated May 16, 1939, Serial No. 187,631, January 29, 1938. Application for reissue October 17, 1940, Serial No. 362,880

17 Claims. (Cl. 266—23)

This invention relates to apparatus for presenting a rod or wire to the nozzle of a cutting torch in order to aid in such operations as the oxygen cutting of steel, de-seaming, billet gouging, billet scarfing or skinning, flame machining and the like.

It is an object of this invention to provide improved apparatus for feeding a starting rod or wire into the jets at the end of a cutting tip. More specifically, it is an object of the invention to provide an attachment which can be connected to a conventional cutting torch and operated from the same handle that controls the supply of cutting oxygen to the tip.

One feature of the invention relates to mechanism that feeds a definite length of rod and that does not become unreliable as the result of wear.

Since the starting rod must be heated before the cutting oxygen is turned on, it is desirable to feed the rod into the gas flame jets before opening the cutting oxygen valve. Another feature of this invention relates to connections through which the cutting oxygen control lever operates the rod feed and oxygen valve successively.

Other objects, features and advantages of the invention will appear or be pointed out as the specification proceeds.

In the accompanying drawing, forming a part hereof:

Fig. 1 is a side view, partly in elevation and partly in section, showing a cutting torch with mechanism of this invention for supplying a starting rod to the torch tip.

Fig. 2 is a detail view taken on the line 2—2 of Fig. 1.

The drawing shows a cutting torch 11 with a removable tip 12, held in place by a tip nut 13. The tip 12 can be replaced by a smaller or larger tip to accommodate the torch to different work in a manner well understood in the art. The torch has a body 15, in which is located the valve that controls the supply of cutting oxygen to the tip 12.

The tip 12 has a central cutting jet orifice 16 and one or more preheating jet orifices 17. The supply of oxygen to the central cutting jet orifice 16 is controlled by a valve 18 which is urged into the closed position shown in the drawing by a coil spring. This cutting oxygen supply valve has an operating stem 19 that extends through the side of the torch body. A lever 20 is connected with the torch by a pivot pin 21 that passes through one end of the lever and through a bifurcated bracket 22 fastened to the side of the torch body. Movement of the lever 20 into the dotted-line position displaces the stem 19 and opens the cutting oxygen valve 18.

The wire or rod feeding mechanism includes a tube 24 with a front rod guide 25 at one end and a rear rod guide 26 at the other end. These rod guides are secured to the tube 24, and with the tube comprise a container for a block 26 which serves as a pawl housing. The openings through the rod guides 25 and 26 are in alinement with an opening 29 through the block or pawl housing 28.

A starting wire or rod 30 extends through the rod guides 25 and 26 and the opening 29 in the pawl housing 28. The diameter of the rod 30 is slightly less than the diameter of the openings through which the rod passes, but there are brakes to prevent the rod from sliding too easily in the rod guides 25 and 26.

The brake on the rod guide 25 consists of a leaf spring 31 fastened to the outside of the rod guide by screws 32 and contacting with the rod 30 through a slot 33 in the top side of the rod guide 25.

In the rear rod guide 26 there is an opening through which a ball 35 is pressed against the rod 30 by a spring 36. A plug 37 threads into the top end of the opening that houses the spring 36 and compresses the spring 36 against the ball 35.

A housing 40 on top of the tube 24 contains a lever 41 that rocks on a pin 42 supported by the housing 40. The lower end of the lever 41 extends into a recess in the top of the pawl housing 28 and comprises in effect a sliding block linkage so that the pawl housing and the lower end of the lever 41 move together.

The pawl housing 28 is a sliding fit in the tube 24. A screw 44 threaded through the front rod guide 25, and held in set position by a lock nut 45, acts as an adjustable abutment for limiting the length of the stroke of the pawl housing 28 in the tube 24.

A spring 46 urges the pawl housing 28 against the rear rod guide 26. The spring 46 is large enough to allow the rod 30 to pass through it, and the ends of the spring fit into recesses in the confronting faces of the pawl housing 28 and front rod guide 25.

An opening 48 extends across the pawl housing 28, and the lowest part of this opening is somewhat below the top edge of the starting rod 30. A pawl 49 in the opening 48 is of generally segmental cross-section but has a lug at its upper end fitting into a complementary recess at the top of the opening 48 and serving as a fulcrum for the pawl 49.

A spring 50 fitting into recesses in the pawl 49 and front wall of the opening 48 is compressed between the pawl and front wall and urges the pawl rearwardly so that the lower edge of the pawl is against the top of the rod 30. The fulcrum of the pawl 49 is rearward of the lower edge of the pawl for all positions occupied by the pawl, with the effect that upon forward movement of the pawl housing 28 the pawl tends to dig into the rod 30 and binds it so that the rod has to move forward when the pawl housing does. The pawl 49 and housing 28 comprise, therefore, a clutch that grips the starting rod to feed it forward.

Upon rearward movement of the pawl housing, however, the pawl 49 merely drags across the top of the rod 30 with what friction is produced by the weight of the pawl and the pressure of the spring 50. This friction of the pawl on the rod 30 during the rearward or return movement of the pawl housing is not sufficient to move the rod back because it can not overcome the holding force of the brakes 31 and 35.

The length of rod fed forward at each stroke of the pawl housing 28 is substantially equal to the length of the stroke, there being little or no lost motion while the pawl 49 grips the rod 30 because the pawl is always in contact with the rod, and the rod is hard enough and slides easily enough so that the pawl does not dig into the surface of the rod. The screw 44 is adjusted to obtain the desired length of feed.

After the rearward end of the rod 30 reaches the forward end of the pawl stroke, the pawl can push the rod no further, but a new length of rod is inserted into the rear rod guide 26 and pawl housing 28 by hand, and as this new length of rod is fed forward by the pawl it pushes the short end of the rod ahead of it. The spring 31 holds the old rod straight in the rod guide 25 up until the end of the old rod passes from the rod guide, at which time the old rod has been reduced to an extremely short length. The ability of this invention to use lengths of rod that have become too short for the feed mechanism to operate upon them effects a substantial saving in rods and is one of the advantages of this invention over devices of the prior art.

Wear of the lower end of the pawl 49, and some wear is inevitable after continued use, does not reduce the efficiency of feed mechanism. The position of a worn pawl at the time of binding the rod 30 is somewhat lower than the new pawl, but the feeding mechanism does not rely upon a sharp edge on the pawl; surface contact is just as effective as point or line contact. The feeding mechanism of this invention is positive because it relies upon binding or jamming of the rod and not merely upon friction. The fact that the feed remains positive and reliable in spite of wear of the feeding mechanism is another advantage of this invention over prior art devices.

The lever 41 is rocked clockwise about the pivot 42, to feed the starting rod forward, by a tension member 52. The tension member comprises a rod 53 that telescopes into a sleeve 54. A clamp 55 at one end of the sleeve 54 clamps against the rod 53 and holds the sleeve and rod against movement relative to one another, and provides a convenient means for adjusting the length of the tension member 52.

The rod 53 has a connecting link 57 at one end connected with the upper end of the lever 41 by a pin 58. A plunger rod 60 threads into an enlarged end on the sleeve 54. A head on the plunger rod 60 slides in a plunger rod housing 63 and is urged against the end of the housing by a spring 64 compressed between the head of the plunger rod 60 and an adjusting screw 65 that threads into the end of the plunger rod housing 63 and can be screwed in by different amounts to adjust the tension of the spring.

A pivot connection 67 fastens the end of the plunger rod housing 63 with a clamp 68 that can be adjusted to different positions along an arm 69 extending from the valve operating lever 20. The travel of the tension member 52 is increased by moving the clamp 68 further down on the arm 69, that is, further away from the pin 21 about which the valve operating lever 20 and its attached arm 69 rock as a center.

The screw 65 is adjusted to produce a tension in the spring 64 sufficient to permit the tension member 52 to rock the lever 41 and advance the pawl housing 28 for its full stroke, against the pressure of the spring 46, before the valve-operating lever 20 has moved far enough to contact with the stem 19. With the rod feeding mechanism in its forward position, further movement of the valve-operating lever 20 causes the arm 69 and plunger rod housing 63 to move without the plunger rod 60 while the adjusting screw 65 compresses the spring 64 to obtain the over-travel.

A lug 72 rigidly connected to the top of the tube 24 is held in a clamp 73 by a bolt 74 that passes through the lug 72 and the bifurcated ends of the clamp 73. If the bolt 74 is loosened, the rod feeding mechanism supported by the lug 72 can be turned into various angular positions with respect to the clamp 73.

A bracket 75 clamped to the tubing of the torch 11 has a stem 76 extending into the upper portion of the clamp 73. Screws 78 draw the upper ends of the clamp 73 together and cause them to grip the stem 76. The stem 76 is long enough to permit the clamp 73 to be located in a wide range of positions to accommodate the rod feeding mechanism for all lengths of tips with which it is used. The adjustment of the clamp 73 up and down on the stem 76, combined with the angular adjustment that can be made at the bolt 74, makes it possible to adjust the rod feeding mechanism to feed the rod 30 into the region of the heating jets at the most advantageous distance from the end of the different-length tips.

The preferred embodiment of the invention has been described, but changes and modifications can be made and some features of the invention may be used without others.

I claim:

1. The combination with an oxygen cutting torch having a tip, a valve that controls the supply of cutting oxygen to the tip, and a control handle for operating the valve, of apparatus for feeding a starting rod to the tip including a clutch movable back and forth with a predetermined stroke and constructed and arranged to grip the rod during movement in one direction to advance successive lengths of rod, motion transmitting means connected between said control handle and the clutch, and a yieldable connection in said motion transmitting means including a spring that prevents said connection from yielding before the clutch has reached the end of its rod-advancing stroke.

2. An oxygen cutting torch having a cutting jet orifice and one or more preheating jet orifices, and including a valve for controlling the supply of cutting oxygen, a control handle movable through a stroke, a valve-operating member in position to be displaced in a direction to open said valve during the latter part, and only the latter part, of the stroke of the handle in one direction, apparatus for supplying a starting rod to the flames issuing from said preheating jet orifices, said apparatus comprising a series of connected movable elements that are actuated from said control handle and that transmit motion from the control handle to the starting rod, said movable elements including a reciprocating device that advances the starting rod, and an abutment in the path of one of said movable elements for preventing actuation of the reciprocating device to advance the starting rod during the latter part of the stroke of the control handle.

3. An oxygen cutting torch having a cutting jet orifice and one or more preheating jet orifices, and including a valve for controlling the supply of cutting oxygen, a control handle movable through a stroke, a valve-operating member in position to be displaced in a direction to open said valve during the latter part, and only the latter part, of the stroke of the handle in one direction, apparatus for supplying a starting rod to the flames issuing from said preheating jet orifices, said apparatus comprising a series of connected movable elements that are actuated from said control handle and that transmit motion from the control handle to the starting rod, said movable elements including a reciprocating device that advances the starting rod, an abutment in the path of one of said movable elements for preventing actuation of the reciprocating device to advance the starting rod during the latter part of the stroke of the control handle, and a spring that reacts against one of the movable elements for causing that element to transmit motion from the control handle to the reciprocating device, said spring being in position to yield after the abutment stops further movement of the reciprocating device.

4. In cutting apparatus comprising a torch that has preheating jet orifices, a cutting oxygen supply valve, and means for feeding a starting rod to the preheating jets before the cutting oxygen valve is opened, the improvement which comprises a common lever for operating both the feeding means and the oxygen supply valve, a motion transmitting member between the rod feeding means and said lever, and connecting means between said member and said lever movable along said lever toward and from the fulcrum of the lever to control the amount of travel of the motion transmitting member for a given angular movement of the lever.

5. The combination in an oxygen cutting torch of a starting rod feed apparatus including a reciprocating device that during its forward stroke grips the rod, an adjustable abutment for limiting the stroke of said device to control the length of rod fed at each stroke, a handle that controls the supply of cutting oxygen for the torch, and motion transmitting means by which the rod feeding apparatus is operated by said handle, including connecting means located on the handle and movable into different positions on the handle to change the travel of said motion transmitting means for a given movement of the handle.

6. A starting rod attachment including a bracket for connection with a cutting torch, a rod feeding device including guides holding the rod in a fixed angular relation in the feeding device, an element between the feeding device and the bracket, a connection joining said element and the bracket, and another connection joining said element and the feeding device, one of said connections being slidably adjustable and the other angularly adjustable.

7. The combination of an oxygen cutting torch having a handle for operating the cutting oxygen supply valve, a starting rod feeding device, bracket means connecting the starting rod feed device with the torch, said bracket means being adjustable to change the position of the feed device with respect to the torch to accommodate the feed device to the length of the torch tip, and motion transmitting connections by which the handle that operates the cutting oxygen supply valve also operates the rod feed device, said connections including parts that are relatively adjustable to compensate for changes in the position of the rod feed device.

8. The combination of a cutting torch having a cutting oxygen supply valve, a starting rod feed device, an abutment limiting the movement of said feed device, a common operating handle for the valve and feed device, motion-transmitting means including elements connected between the operating handle and feed device, and a spring that reacts against an element of said motion-transmitting means for causing that element to transmit motion from the handle to the feed device, said spring being in position to yield so that a portion of the motion-transmitting means connected with the handle can continue to move after the feed device has come against the abutment and the portion of the motion-transmitting means connected with said feed device can move no further.

9. In a cutting torch having a valve, a valve-operating lever, and a starting rod feed device, the improvement that comprises apparatus for causing successive operation of the feed device and valve, said apparatus including motion-transmitting means between the valve-operating lever and the rod feed device for operating said device to feed the rod during the initial movement of the lever in one direction, an abutment in the path of one of the elements that is moved by said initial movement of the lever for preventing the feed device from operating during further movement of the lever in the same direction, the motion-transmitting means including a connection constructed and arranged to yield during said further movement of the valve-operating lever, and a spring for preventing the connection from yielding during said initial movement of the valve-operating lever.

10. Apparatus for feeding a starting rod to the tip of an oxygen cutting torch including a container having a rigid bearing surface that is parallel to the direction in which the starting rod is fed and means for connecting said container to the cutting torch, a housing in said container movable to and fro along said bearing surface of the container and held in line with the starting rod by said bearing surface so that said housing has a straight-line reciprocating motion, and clutch means in said housing adapted to cause the rod to move with the housing during the movement of the housing in one direction along said surface.

11. Apparatus for feeding a starting rod to the tip of an oxygen cutting torch including a container with means for connecting it to the cutting torch, a reciprocating clutch means within the container and through which the starting rod passes, said clutch means being constructed and arranged to grip the rod during movement of the clutch means in one direction, and feed adjusting means for controlling the length of rod advanced by the clutch means, said feed adjusting means including an element threading through an end of said container into the path of the reciprocating clutch means and extending in the direction of movement of said clutch means so that the end of said element serves as an adjustable abutment for limiting the stroke of the reciprocating movement of the clutch means.

12. Apparatus for feeding a starting rod to the tip of an oxygen cutting torch including a stationary container with means for rigidly connecting it to the cutting torch, clutch means located inside of said stationary container and movable back and forth on a bearing surface within said container and adapted to grip the rod during movement of said clutch means in one direction, a guide through which the starting rod passes, and a brake element supported by said container and movable with respect to the container and guide into friction contact with the starting rod.

13. In an oxygen cutting torch, an apparatus for feeding a starting rod to the tip of the torch including a block with an opening through which the starting rod passes, means for causing the block to move toward and from the tip, and an element carried by the block in continuous contact with the rod and movable with respect to the block to clamp said rod against movement relative to the block when the block moves toward the tip.

14. Apparatus for feeding a starting rod to a cutting torch comprising a container fastened to the cutting torch, said container including guides through which the rod passes, a block slidable in the container and having an opening through which the rod passes, a pawl carried by the block in position to jam the rod against the side of the opening and prevent relative movement of the rod and block when the block moves in one direction, and brake means for holding the rod stationary when the block moves in the other direction.

15. An attachment for an oxygen cutting torch including an element through which a starting rod is advanced to the region of the torch tip, a feeding device movable to and fro and constructed and arranged to grip the rod when moving in one direction only, and motion transmitting connections for operating the feeding device including a lost-motion connection of such a nature that a part of the motion transmitting connections can continue to move after the feeding device reaches the limit of its movement.

16. An attachment for an oxygen cutting torch including an element through which a starting rod is advanced to the region of the torch tip, a feeding device movable to and fro and constructed and arranged to grip the rod when moving in one direction only, motion-transmitting means for actuating the feeding device from a manually-operated lever, and a spring associated with said motion-transmitting means and reacting to cause motion of the lever to be transmitted to the feeding device until said feeding device reaches its limit of movement, said spring being constructed and arranged to yield as the manually-operated lever moves further after the feeding device has reached its limit of movement.

17. In cutting apparatus including a starting rod feed device with clutch means that moves to and fro and advances the starting rod toward the tip of a cutting torch during the forward movement of said clutch means, the improvement of a rod guide located between the clutch means and the tip, and extending close to the region of the tip to provide a support for the short end of starting rod after said starting rod has advanced beyond the forward limit of the travel of the clutch means, and spring means for holding a short end of a starting rod straight in said guide but free to move in response to pressure from a new length of rod behind it.

GEORGE L. WALKER.